United States Patent Office 3,400,149
Patented Sept. 3, 1968

3,400,149
PROCESS FOR PREPARING ORGANO-PHOSPHOROUS COMPOUNDS USING PHOSPHOROUS ACID ANHYDRIDES
Oscar T. Quimby, Colerain Township, Ohio, and James B. Prentice, Batesville, Ind., assignors to The Procter & Gamble Company, Cincinnati, Ohio, a corporation of Ohio
No Drawing. Continuation-in-part of application Ser. No. 444,033, Mar. 30, 1965. This application May 31, 1966, Ser. No. 553,648
9 Claims. (Cl. 260—502.4)

This patent application is a continuation-in-part of a patent application Ser. No. 444,033 filed Mar. 30, 1965, by Oscar T. Quimby and James B. Prentice and now abandoned.

This invention relates to a process for preparing organo-phosphorous compounds and more especially to organo-diphosphonate compounds and specifically ethane-1-hydroxy-1,1-diphosphonic acid and salts thereof.

Diphosphonic acid and derivatives thereof are known compounds, methods for their preparation having been described as early as 1897, by H. von Baeyer and K. A. Hofmann, Ber. 30, 1973–8 (1897). Other pertinent references include B. T. Brooks, J. Am. Chem. Soc., 34, 492–9 (1912); German Patent 1,010,965 dated May 8, 1956; German Patent 1,072,346 dated Dec. 31, 1951; German Patent 1,082,235 dated May 25, 1960; German Patent 1,107,207 dated May 25, 1961; British Patent 940,138 dated Oct. 23, 1963; and United States Patent 3,159,581 dated Dec. 1, 1964. Some of these references discuss also the uses and applications of ethane-1-hydroxy-1,1-diphosphonic acid and salts thereof which cover widely their use as sequestering and complexing agents as well as a builder in detergent compositions.

Each of the known methods for preparing diphosphonate compounds has certain disadvantages. For the most part, these stem from the fact that the chemistry involved is extremely complicated and the reaction systems result in the formation of numerous unknown and unidentified intermediates. Moreover, the basic reactions have been so little understood that it has heretofore been virtually impossible to control or direct the reactions to prepare high yields of a desired diphosphonate compound such as ethane-1-hydroxy-1,1-diphosphonic acid.

Baeyer and Hofmann's process involved a reaction between acetic acid and phosphorus trichloride. This reaction proceeds through the intermediate formation of acetylchloride and phosphorous acid. Brooks' work was closely related, as are the reactions discussed in the foregoing German, British, and United States patents.

The reaction between acetic acid and phosphorus trichloride should be carried out in special corrosion-resistant equipment due to the formation of hydrochloric acid as a by-product of the reaction. Special pressure equipment is necessary for when the reaction is run at atmospheric pressure, large amounts of acetyl chloride are formed as reaction intermediates, and this necessitates low reaction temperatures in order to minimize loss of this essential intermediate reactant to the hydrochloride gas stream. The low reaction temperature results in a low reaction rate and unduly long reaction times with variable yields. Only by the use of costly corrosion-resistant pressure equipment have these problems been overcome, and even then the reaction products are frequently made in poor yields and variable composition. Quite frequently the reaction products prepared in the known methods consist of conglomerate mixtures that cannot be separated into pure ingredients.

Accordingly, it is an object of the present invention to provide a process for preparing ethane-1-hydroxy-1,1-diphosphonic acids and salts thereof which is free of the disadvantages associated with the previously known methods. Another object is to provide a process for preparing ethane-1-hydroxy-1,1-diphosphonic acid and its salts which is rapid, inexpensive, readily controlled, and which provides for substantially complete conversion of the starting phosphorous containing reactant to the desired product. Yet another object is to provide an improved process by which ethane-1-hydroxy-1,1-diphosphonic acid can be prepared in substantially pure form and in high yields. These and other objects will become apparent from a careful reading of the following description of the present invention.

According to the present invention, it has been discovered that the foregoing objects can be obtained by a process which in its broadest terms basically involves reacting acetic acid with an anhydride of phosphorous acid to form a reaction mixture containing phosphite intermediate compounds, heating said reaction mixture and converting said phosphite intermediate compounds to compounds containing carbon atoms bonded directly to phosphorous atoms and, thereafter, hydrolyzing said compounds containing carbon atoms bonded directly to phosphorous atoms to form phosphonic acids.

In all of the previously known processes for preparing ethane-1-hydroxy-1,1-diphosphonic acid, $$CH_3C(OH)(PO_3H_2)_2$$

represented by the following structural formula

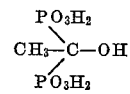

which processes involved phosphorous acid as a reactant, the necessary anhydrizing power was brought to the reaction system through either acetic anhydride, acetyl chloride or ketene. The present invention has taken a radical departure from this technique and it is basic to a full understanding of the present invention that the anhydrizing species is the phosphorous-containing compound, that is, an anhydride of phosphorous acid. An anhydride of phosphorous acid, such as $P_4O_6$, reacts readily with hydroxyl-containing compounds, and according to the present invention it is reacted with acetic acid and water in certain sequences described more fully hereinafter.

Anhydrides of phosphorous acid can be thought of as dehydration products of phosphorus acid. Phosphorus acid itself has the formula $H_3PO_3$ or in other terms $(H)(O)P(OH)_2$. Ordinarily, dehydration products of this acid are characteristically represented by the number of molecules of water which have been removed from a given amount of the acid. For example, typical references to anhydrides are $2H_3PO_3\cdot 1H_2O$ which defines a pyrophosphorus acid molecule, i.e.,

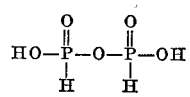

$4H_3PO_3\cdot 4H_2O$ which can be thought of as representing a molecular arrangement such as tetrametaphosphite:

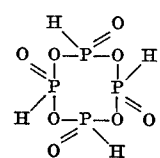

$4H_3PO_3\cdot 6H_2O$, which represents the most condensed form of an anhydride of phosphorous acid, is called phosphorous anhydride, has the formula $P_4O_6$, a melting point of 24–25° C., and the following structure:

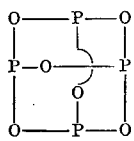

Anhydrides of phosphorous acid less condensed than $P_4O_6$ can be made from $P_4O_6$ by adding phosphorous acid and/or water; thus, pyrophosphorous acid can be formed by adding either 8 mols $HPO_3H_2$ or 4 mols $H_2O$ to 1 mol $P_4O_6$. Other intermediate anhydrides can be formed in like manner.

Not all of the intermediate anhydrides of phosphorous acid have been isolated and separated as pure compounds. Their existence is a virtual certainty, however, and analysis and investigations of phosphorous reactions have long been thought of as involving or passing through the formation of intermediate forms of anhydrides of phosphorous acid. According to the present invention, the preferred reagent for introducing the necessary anhydrizing power into the system is $P_4O_6$. Other anhydrides of phosphorous acid can be prepared in situ and can, under some circumstances, afford results comparable to or better than $P_4O_6$; this is demonstrated, for instance, in some of the examples presented later. Likewise, $P_4O_6$ can also be prepared in situ, e.g., by oxidizing elemental phosphorous to $P_4O_6$ in the presence of the acetic acid. Although the invention is discussed primarily in terms of $P_4O_6$, it should be clearly understood that it applies equally to $P_4O_6$ and each of the other anhydrides whether the anhydrides of phosphorous acid are formed in situ or whether the starting anhydride, e.g., $P_4O_6$, is prepared independently. The ultimate consideration as to the suitability of an anhydride of phosphorous acid for purposes of the present invention is the anhydrizing power of that particular anhydride. All of the anhydrides of phosphorous acid can be used which have an anhydrizing power equal to or greater than 1; for high yields, anhydrides more condensed than pyrophosphorous acid are desirable. Anhydrizing power of the reaction mixture, for purposes of this invention, can be defined as the number of moles of anhydride links per mole of desired resultant, namely, ethane-1-hydroxy-1,1-diphosphonic acid. One such unit is consumed in making each mole of ethane-1-hydroxy-1,1-diphosphonic acid; any excess of anhydrizing power will be reflected in the final product. One such product resulting from a reaction mixture containing two anhydride units is a cyclic condensate of ethane-1-hydroxy-1,1-diphosphonic acid. Said compound is readily crystallized from the reaction mixture; it has the following structure:

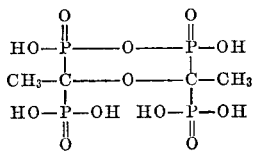

Since the C—P bonds are so much more stable than the condensate bonds found in the various reaction products; namely, the C—O—C ether bonds, P—O—P and C—O—P anhydride bonds, and C—O—P ester bonds, all of the latter can be readily hydrolyzed without rupture of the C—P bonds. Hence, cyclic condensate and all other condensates, including the half-condensate resulting from hydrolysis of P—O—P in the cyclic condensate structure shown above, can readily be hydrolyzed quantitatively to the ethane-1-hydroxy-1,1-diphosphonic acid.

The reaction between $P_4O_6$ and acetic acid is highly exothermic. If, for instance, $P_4O_6$ is added rapidly to small amounts of acetic acid, a large amount of heat is generated evidencing a very rapid reaction. This condition can be controlled by adding the $P_4O_6$ to the acidic acid more slowly and allowing the heat to be evenly dissipated. A homogeneous solution is formed when the two reactants are mixed. As the reaction occurs, however, the mixture may become cloudy, and this is accompanied by accelerating heat evolution. It is usually found desirable, however, to run the reaction in the presence of a diluent in order to absorb some of the heat of reaction. While other anhydrides of phosphorous acid generate less heat of reaction than $P_4O_6$, the reactions are nevertheless exothermic and they likewise tend to form insoluble reaction intermediates as evidenced by darkening and clouding of the reaction mixture. The intermediates may vary in consistency from fairly viscous syrups to more glassy solids. Due to the viscosity of the reaction solution, cooling as a means of handling the heat of reaction is permissible but less practical than using a diluent or providing for an adjustment in the speed of mixing the reactants. Such precipitates can considerably slow down the desired molecular rearrangement of the phosphorous-hydrogen bonds to the necessary phosphorus-carbon bonds, and also interferes with the exchange of reactants between phases. Therefore, another purpose which the diluent serves other than as a heat sink is to be at least a partial solvent for not only the initial reactants but also for the intermediate precipitates just described.

It is not necessary that the anhydride intermediates be completely or even largely soluble in the organic diluent medium. For instance, the syrupy anhydride intermediates were only moderately or slightly soluble in almost all solvents tried, including more highly polar solvents, and yet the reaction mixture was fluid enough to allow effective stirring, thus partially overcoming the barriers to the reaction mentioned above.

The solubility problems encountered in the reaction between the anhydride of phosphorous acid and acetic acid are substantially eliminated by using acetic acid in excess of the stoichiometric quantities. The use of excess acetic acid, as described below, eliminates the need for another solvent or diluent for it serves satisfactorily as its own solvent as well as a solvent for the reaction intermediates. The acetic acid which is used in excess, i.e., above stoichiometric amounts, constitutes the organic solvent described herein as being desirable for the basic reaction between the anhydride of phosphorous acid and acetic acid.

The necessary properties of the diluents, apart from acetic acid, are that they should be chemically inert to the starting reactants yet dissolve them and also be able to partially dissolve the reaction intermediates which are formed and which tend to precipitate out. As noted above, although a portion of the acetic acid reacts with the anhydride of phosphorous acid, it still satisfies these properties when used in sufficient amounts. Other materials can likewise be used as solvents or diluents for this reaction. Generally, it has been found that the solvents should have a high enough boiling point so that they will not boil off and be lost during the reaction, and by the same token be able to serve as a heat sink by absorbing the heat of reaction. The boiling point of the solvent should be higher than about 110° C. The terms solvent and diluent are used interchangeably in describing the present invention. Either term is intended to denote each of the functions noted above, i.e., as a solvent and as a diluent.

Sulfones proved to be a satisfactory type of solvent material. Di-n-propyl sulfone, $(C_3H_7)_2SO_2$, and sulfolane $CH_2CH_2CH_2CH_2SO_2$ can be used either alone or in binary mixtures. The mixtures can consist of any proportions of the two materials, but preferred ratios range from about 9 parts of di-n-propyl sulfone to 1 part of sulfolane to about 1 part of di-n-propyl sulfone to 9 parts of sulfolane. For some reactions, mixtures are actually preferred. The reason for this is that the relatively high dielectric constant (polarity) of the sulfones is barely adequate to induce some solubility of the anhydride intermediates; at the same time, sulfones have been proven to be chemically inert to the very reactive compounds like $P_4O_6$ and the anhydride intermediates of this system.

Other satisfactory solvents include tetrachloroethane, $Cl_2CHCHCl_2$, and dibutyl ether $(C_4H_9)_2O$ and diglyme, $CH_3OCH_2CH_2OCH_2CH_2OCH_3$. The halogenated hydrocarbon appeared to dissolve the intermediates as well as or better than the aforementioned sulfones. It was noted, however, that it seemed to react with the $P_4O_6$ and/or one of the intermediates of the reaction mixture; and for this reason it is somewhat less desirable than the sulfones, although satisfactory in all other respects. The lower aliphatic ether compound, dibutyl ether, on the other hand, was chemically inert to the initial reagents but was not polar enough to dissolve the reaction intermediates as much as the sulfones or tetrachloroethane solvents. Just as mixtures of the di-n-propyl sulfone and sulfolane provide the advantages of each compound, similarly one can use mixtures of tetrachloroethane and dibutyl ether, in all proportions. Mixtures can also be used of these four compounds as well as others which meet the requirements set forth above.

It can readily be appreciated, in light of the preceding discussion, that the quantity of solvent, while important, is not itself a critical feature.

In the embodiment of the present invention according to which acetic acid is used in sufficient excess to serve not only as the reactant but also as a solvent for the reaction, the amount of acetic acid at times ranges up to as high as 100 moles of acetic acid per mole of the anhydride of phosphorous acid. Even higher amounts can be used but the desired reaction and rearrangement of reaction intermediates as described herein is considerably slowed down. Consequently, it has been found desirable to operate with molar proportions of the acetic acid to the anhydride of phosphorous acid of from about 1.5:1 to about 50:1 and more preferably, from about 2:1 to about 20:1.

As regards other suitable solvents and diluents as illustrated and described above, they should be employed at a level of from about .5 to about 5 times the combined weight of the reactants. The minimum amount which should be used is that amount which is necessary to efficiently control the reaction. In other words, there should be enough solvent present to satisfy the solubility requirements as detailed above and also an amount sufficient to absorb the generated heat of reaction. While certain embodiments of the present invention have been described in terms of the diluent consisting of excess acetic acid or one of the specific illustrative materials, the diluent can also contain mixtures of excess acetic acid and at least one or more of the other suitable diluents. Examples hereinafter demonstrate this feature.

The order of mixing the acetic acid, the anhydride of phosphorous acid and the solvent, if one is used, will depend on the exact reaction system employed. For example, the appropriate amount of water or phosphorous acid must be reacted with $P_4O_6$ first if an anhydride of phosphorous acid other than $P_4O_6$ is to be reacted with acetic acid. This applies to the embodiment in which an anhydride of phosphorous acid is employed which is less condensed than $P_4O_6$. On the other hand, if $P_4O_6$ is to be formed in situ such as by starting with elemental phosphorus, the conversion to the desired oxide will precede the acetic acid reaction. The solvent, if used, can be present during the start of the reaction or added as needed.

In order to take full advantage of the present invention, it is desirable to have an excess of the acetic acid reactant over the anhydride of phosphorous acid when the reaction is not aided by the subsequent crystallization of the aforementioned cyclic condensate. Theoretical ratios can be used in a reaction where said crystallization does occur. Reaction will occur between acetic acid and $P_4O_6$ in any ratio of the reactants. Under some circumstances, however, the reaction will not always go to completion, or result in the formation of undesired by-products which affect the overall yield of the desired ethane - 1 - hydroxy - 1,1 - diphosphonic acid product.

As soon as the reactants are brought together at about room temperature, they react very rapidly and form a great variety of intermediates, including anhydrides which may involve three kinds of bond (C—O—C, C—O—P, and P—O—P); those containing phosphite are revealed in cold reaction mixtures by phosphorus magnetic resonance doublets (coupling constant of the order of 700–750 c.p.s.) centered at +4 p.p.m. for end phosphite groups and at −1 p.p.m. for middle phosphite groups, these being relative to 85% $H_3PO_4$ (external standard) as 0.0 p.p.m.

The phosphite anhydride intermediates formed during the low temperature stages of the reaction begin to rearrange immediately and continue as the temperature is being raised to a range of about 90° C. to about 150° C; during this rearrangement the phosphite anhydrides with P—H bonds change to phosphonates with P—C bonds. If the anhydrizing power is relatively high, say 1.5 to 3.0 times that theoretically required to form ethane - 1-hydroxy - 1,1 - diphosphonic acid, then further condensation may occur to form new P—O—P anhydride links between two phosphonate groups, C—O—C ether links between two alcohol (OH) groups on carbon, or C—O—P ester links between an alcohol (OH) group on carbon and acid OH on a phosphonate. Regardless of the exact chemical nature of the phosphonate products from such heating, the purpose of the heating step is to convert the P—H bonded material (phosphite) substantially completely to P—C bonded material (phosphonates or phosphonate condensates).

When the anhydrizing power approaches 3, the minimum heating time for essentially complete conversion to P—C bonded compounds is but a few minutes, i.e., when lower anhydrizing power is used, this conversion requires more heating time. Several hours can be used if desired.

Although a few minutes have been set as a critical lower limit, the upper limit is, for all practical purposes, less important. For any given reaction, the heating period can last for as long as three to four hours, but such extended heating times are exceptional. Within the broad range of from about three minutes to about four hours, it is generally preferred to operate within a time period of from about 15 minutes to 60 minutes.

The temperature at which the phosphonate carbon-to-phosphorous bonds form rapidly, as already mentioned, is in the range of from about 90° C. to about 150° C. Below this temperature the conversion is relatively slow due, in part, to the gummy, viscous reaction mixture. Temperatures in excess of about 150° C. result in orthophosphate compounds appearing in the final product in increasing quantities. A preferred range in which to operate is from 100° to 140° C.

The condensed phosphonate intermediates containing carbon-to-phosphorus bonding, which comprise the reaction mixture after heating, are then hydrolyzed by the addition of water to the reaction mixture to form a hydrolyzed solution containing free ethane - 1 - hydroxy-1,1 - disphosphonic acid and free acetic acid. All condensed links of the anhydride type (C—O—C, P—O—P), ester type (C—O—P), and ether type (C—O—C) are hydrolyzed substantially completely to ethane - 1 - hydroxy - 1,1 - diphosphonic acid.

The amount of water employed in the hydrolysis step should exceed the theoretical amount necessary to convert the anhydride of phosphorous acid to free phosphonic acid. By "theoretical," is meant that amount of water, in mols, that will satisfy the difference between the number of anhydride bonds in the anhydride of phosphorous acid used as a starting reagent, less one for each mol of acetic acid used to form the product, ethane-1-hydroxy-1,1-diphosphonic acid. In the event that $P_4O_6$ is the starting anhydride reagent and it is reacted with 2 moles of acetic acid, the amount of water necessary to complete the hydrolysis reaction is at least 4 mols. If a less condensed anhydride of phosphorous acid is reacted with 2 moles of acetic acid, the amount of water necessary for complete conversion to the free acid form will be proportionately less.

The hydrolysis step can be carried out at room temperatures, but usually higher temperatures are used. A satisfactory rate is attained in the range of 90° C. to 170° C. The preferred range is 100° C. to 150° C.

The hydrolysis can be only partially completed by adding less than the theoretical amount of water, or it can be totally completed by flooding the system with an excess of water. The process is flexible at this stage in the reaction. If, for any reason, only partial hydrolysis is desired at this point in the reaction, the balance of the water addition can be made a part of the purification steps described below.

Following the partial or complete hydrolysis treatment, the reaction product contains the desired free phosphonic acid. There can also be present within the reaction, however, any unreacted acetic acid, perhaps some acetyl-containing anhydride intermediates, for example, mono- or di-acetylphosphonates and the like, as well as the organic solvent if one was used.

Separation and recovery of the free diphosphonic acid formed during the hydrolysis step can be by any convenient manner. If, in fact, the cyclic condensate has been crystallized by this stage of the process, it can be filtered off and subsequently hydrolyzed to yield pure ethane-1-hydroxy-1,1-diphosphonic acid. If the cyclic condensate has not been crystallized, the ethane-1-hydroxy-1,1-diphosphonic acid can be separated and recovered by an ordinary steam distillation process described more fully below. Another alternative procedure embodies separating the free diphosphonic acid by crystallizing it from the partially or completely hydrolyzed reaction mixture. Other recovery methods can also be used which may embody a combination of the foregoing procedures.

As mentioned, work-up of the ethane-1-hydroxy-1,1-diphosphonic acid containing reaction product can include a steam distillation step to remove the acetic acid and at the same time to partially hydrolyze the product. Superheated steam is passed through the reaction mixture with the temperature maintained in a range of from about 100° C. to about 170° C., and preferably from 130° C. to 150° C. The amount of steam required to remove the acetic acid depends in each instance upon the reaction conditions which have been employed. It has been found that a volume of distillate approximately equal to three times the reaction mixture effectively removes the excess acetic acid. Lesser or greater volumes can be used, for example on the order of from about one volume of distillate to about 5 volumes of distillate. Ordinarily, the distillation step can take anywhere from about a few minutes up to several hours, again depending on the reaction conditions. Time periods of from about 15 minutes to about 2 hours have been found especially satisfactory.

In using superheated steam, the temperature of the reaction mixture can range from about 100° C. to about 170° C. and preferably from about 130° C. to about 150° C. The removal of the acetic acid can be performed in other ways also, for example, by using water under pressure in an autoclave to hydrolyze condensates, followed by atmospheric distillation of acetic acid.

Following hydrolysis and after removal of the excess acetic acid from the reaction system, the reaction mixture is comprised essentially of the free ethane-1-hydroxy-1,1-diphosphonic acid, organic solvent, if it was not removed before hydrolysis, minor amounts of certain condensates of the above acid, and sometimes minor amounts of phosphorous and orthophosphonic acids. The phosphite content appears to be somewhat dependent upon the magnitude of the excess acetic acid reagent, and the orthophosphate formation as a by-product appears to be encouraged by exceeding the reaction temperature ranges specified herein or by running at the upper limits of the ranges.

Separation of the free acid from the reaction product can be readily performed by an ordinary solvent extraction process such as, for example, with a water-chloroform mixture. In place of chloroform, any other organic solvent can be used which is immiscible with water and miscible with the diluent used for the reaction. Other examples include tetrahydrofuran, hexane, tetrachloromethylene, tetrachloroethylene, ethyl ether, benzene, xylene and the like. In each instance, all phosphorous species are found in the aqueous phase with no detectable $P^{31}$ species in the solvent layer, e.g., chloroform, by $P^{31}$ nuclear magnetic resonance spectra.

The organic solvent used in the high temperature reaction may be removed at various points in the work-up of the product. For instance, when the cooled reaction product separates into two liquids or into a liquid and a solid, direct separation of the solvent liquid layer may be advantageous by taking with it substantially all of the unreacted phosphorous acid; the more polar solvents (e.g., sulfones) will also dissolve a little ethane-1-hydroxy-1,1-diphosphonic acid. This means of removing the phosphorous acid aids purification of ethane-1-hydroxy-1,1-diphosphonic acid and can be used to return the phosphorous acid to the next cycle for the high temperature reaction in any cyclic process. Any ethane-1-hydroxy-1,1-diphosphonic acid carried along is thus not lost. The net result will be an increased overall yield of ethane-1-hydroxy-1,1-diphosphonic acid.

The solvent may also be removed after hydrolysis, either by a direct separation of the organic diluent layer from an aqueous layer or by performing a chloroform extraction of the mixture. In either case, all phosphorus-bearing species will remain in the aqueous layer, and strictly organic species like the inert diluent and acetic acid will be found in the organic liquid layer.

The solvent or diluent need not be removed until the ethane-1-hydroxy-1,1-diphosphonic acid has been neutralized to make a salt. The physical separation of the organic diluent layer from an aqueous solution of the salt is easily carried out, as is a chloroform extraction also.

By the reaction system described above, the reaction product can contain ethane-1-hydroxy-1,1-diphosphonic acid species at yields of up to about 99 to 100%, based on the phosphorus reagent, depending on the exact reaction conditions used.

The amounts of by-products formed can be made very small; by careful attention to the procedures described herein, they can be substantially completely avoided, thus providing a nearly pure reaction product of ethane-1-hydroxy-1,1-diphosphonic acid. This product can be further purified by crystallization as the acid and/or one of its salts.

The free acid can be neutralized to any desired salt form by addition of an appropriate base such as, for example, sodium or potassium hydroxide. This can be done either before or after the extraction step but not before the hydrolysis step.

As pointed out above, the phosphorous anhydride, $P_4O_6$, which represents one preferred embodiment of the present invention, can be prepared by any manner. Several specific, but illustrative, preparations are described below.

The general procedure and apparatus used was that basically developed by Wolf and Schmager, as described in Berichte 62(1), 771–786 (1929). The apparatus of Wolf and Schmager was modified only slightly in order to perhaps make it easier to use. Briefly, the procedure followed was as follows:

Melted yellow phosphorus was place in a quartz combustion tube and ignited by passing a dry mixture of oxygen and nitrogen through the system. The system was maintained under pressure by simultaneous adjustment of gas flow and air leak in the system. A bath surrounded the combustion tube and served a dual purpose; i.e., (1) to provide heat to keep the phosphorous as a melt, and (2) to quench the hot vapors after ignition of the phosphorous. A more detailed description can be found in the above reference.

Table I, below, shows the conditions used and results obtained of several specific but representative runs employing the foregoing procedure. Runs 1 and 2 were made with the entire charge of $P_4$ in the combustion tube, while in runs 3 to 8, the $P_4$ was stored in a dropping funnel located above the combustion tube and added as needed to maintain only a small pool of $P_4$ in the combustion tube. Runs 1 to 4 were made following precisely the optimum conditions outlined by Wolf and Schmager, i.e., about 55 l./minute of dry 75 mole percent oxygen/25 mole percent nitrogen, at 94 mm. pressure. Runs 5–8 were made to test the effect of increased pressure and/or flow rate and performed satisfactorily. It can be seen from Table I that the optimum conditions designated by Wolf and Schmager provided the higher yields.

The dropping funnel above the combustion tube used in runs 3 to 8 represented a modification of the Wolf and Schmager procedure. This innovation appeared to provide a distinct advantage over placing the entire charge of $P_4$ into the combustion tube. By maintaining only a small pool of $P_4$ in the combustion tube, less $P_4$ was exposed to the heat and light of combustion, resulting in less conversion to red phosphorus. The increased yields of $P_4O_6$ in runs 3 and 4, over 1 and 2, are probably due to the aforementioned change in apparatus.

−113 p.p.m. relative to 85% $H_3PO_4$. This position is typical of a phosphorus triply linked to oxygen. Since both $P_4O_{10}$ and $P_4$ would appear as singlets in $P^{31}$-MR spectra, amounts of greater than 2% would be detected by this method. Reacting the $P_4O_6$ with excess $H_2O$ below 65° C. gave phosphorous acid as the only reaction product.

The examples presented below illustrate in detail the many variations that can be made within the broad limits of the preceding description of the present invention. They are not intended to be limiting in any way because a person skilled in the art, educated by the foregoing description, will be able to devise embodiments of this invention which, although different from the following examples, will nevertheless still fall within the scope of the present invention.

In the following examples, the reaction products were analyzed by $P^{31}$MR spectra and the analytical figures are given as mol percentages of phosphorus of the species indicated. In this system, these figures are not greatly different numerically from the weight percentages. It is also important to point out that in the analyses supplied for each example below, the breakdown includes figures which also show the level of cyclic condensate of ethane-1-hydroxy-1,1-diphosphonic acid which was formed. This has been done to point out that by varying the conditions of the reaction between the acetic acid and the anhydride of phosphorous acid it is possible to obtain greater or lesser amounts of the cyclic condensate which as mentioned previously can be directly and totally hydrolyzed to pure ethane-1-hydroxy-1,1-diphosphonic acid.

For all practical purposes the yield of the ethane-1-hydroxy-1,1-diphosphonic acid species can include the combined analysis figures of the free acid and the cyclic condensate.

EXAMPLE I

Acetic acid, 8.34 cc. (0.146 mol) was dissolved in 23

TABLE I.—PREPARATION OF $P_4O_6$ FROM BURNING ELEMENTAL PHOSPHORUS

| Run No. | Burning time, min. | Flow Rate, l./min. | Pressure, mm. | Total gms. $P_4$ burned | Gms. $P_4O_6$ recovered | Percent yield (based on $P_4$) | Remarks |
|---|---|---|---|---|---|---|---|
| 1 | 57 | 0.52 | 93 | 53 | 24.3 | 25.8 | Entire charge of $P_4$ placed in combustion tube. |
| 2 | 50 | 0.54 | 95 | 52.5 | 38.7 | 30.8 | |
| 3 | 87 | 0.52 | 97 | 91 | 47.9 | 35.8 | Last 20 min. used to burn out tube. |
| 4 | 60 | 0.51 | 94 | 58.7 | 39.0 | 38 | Tube was not burned out. |
| 5 | 64 | 0.76 | 97 | 102.4 | 54.3 | 29.6 | Last 14 min. used to burn out tube. |
| 6 | 82 | 0.60 | 120 | 94.3 | 53.8 | 32 | Run stopped when tube plugged. |
| 7 | 60 | 0.76 | 120 | 70.2 | 43.4 | 34.5 | Run stopped when tube plugged. |
| 8 | 60 | ¹ 0.76 | 120 | 49.8 | 19.8 | 19 | |

¹ Plus 0.05 l./min. $He^2$.

The information contained in Table I is presented as merely illustrative of several methods which can be used to prepare $P_4O_6$ for use as a reactant with acetic acid in accordance with the present invention.

In addition to the examples presented in the table above, a complete run was conducted in the following manner: 52.5 gms. of $P_4$ were placed in a combustion tube submerged in a 50±3° C. water bath. The apparatus described above was maintained close to 95 mm. pressure and a gas mixture of 75 mole percent oxygen and 25 mole percent nitrogen passed through the apparatus at a rate of 0.53 liter per minute. The products from the resulting combustion were continually swept through the combustion tube into a series of cold traps by the flow of gas. The $P_4O_6$ reaction product was removed from the traps by vacuum distillation. The recovered $P_4O_6$ was redistilled to yield 28.73 gms.

The $P_4O_6$ obtained from the above runs was twice distilled, then stored at about 20° F. in light and air-tight vials. The $P_4O_6$ melts to a clear liquid at room temperature, remaining clear even after exposure to bright sunlight for one day. The lack of turbidity in the liquid $P_4O_6$, before and after exposure to sunlight, indicates the absence of $P_4O_{10}$ and red phosphorus, $P_x$, respectively. NMR-P spectra of the liquid $P_4O_6$ shows only a sharp singlet at cc. $Pr_2SO_2$ and 30 cc. sulfolane, 4.2 cc. phosphorous oxide (.0364 mol $P_4O_6$) was added over a 1-minute period with the reaction mixture being heated with a 98° C. oil bath. The pot temperature rose from 86° C. to 102° C. and a gummy precipitate was formed. The temperature then rose sharply to 133° C. then fell slowly to 130° C. This temperature was held for 10 minutes, then cooled to room temperature and held for 1 hour. The reaction mixture was divided into 2 parts at this point: (A) the gummy precipitate, and (B) the clear solvent layer. The two samples were treated as follows:

Sample (A) was treated by adding 30 cc. sulfolane, 20 cc. $Pr_2SO_2$, and an excess of water. Superheated steam was introduced at 125–130° C. until 200 cc. distillate was collected. The water solution was then extracted twice with 100 cc. $CHCl_3$, and neutralized to pH 9 with NaOH. The sample was evaporated to dryness: yield: 27 g. $P^{31}$MR analysis indicated a composition containing 92% ethane-1-hydroxy-1,1-diphosphonic acid (trisodium salt), 3% $HPO_3Na_2$ and 5% $Na_2HPO_4$.

Sample (B): The solvent fraction was steam distilled with superheated steam until 200 cc. of distillate was collected. The residue was diluted with 100 cc. of water, and the organic solvents extracted with $CHCl_3$. The water layer was neutralized to pH 10 with NaOH, and evaporated to dryness. Yield: 4½ g. $P^{31}MR$ analysis indicated a composition containing 92% ethane-1-hydroxy-1,1-diphosphonic acid (trisodium salt), 3% $HPO_3Na_2$ and 5% $Na_2HPO_4$. $P^{31}MR$ analysis on *total* product indicated a composition containing 92% ethane-1-hydroxy-1,1-diphosphonic acid, 3% $HPO_3Na_2$ and 5% $Na_3PO_4$.

EXAMPLE II

Acetic acid, 2.15 g. (0.036 mol), was added at room temperature to 3.94 g. (0.018 mol) $P_4O_6$ dissolved in 18 cc. s-tetrachloroethane. The reaction mixture became quite turbid after 3 minutes at 33° C., then began to become clearer; the reaction mixture was again a clear solution after an additional 18 minutes at 33° C. Heat was applied to the clear solution. In an additional 25 minutes the temperature was 70° C. and a gummy precipitate had formed. The temperature continued to rise slowly until it reached 101° C., at which point the temperature jumped to 123° C. and the entire reaction charge gelled. An aqueous solution of the reaction mixture freed of s-tetrachloroethane was analyzed by nuclear magnetic resonance.

The $P^{31}MR$ analysis revealed that the product contained 82% ethane-1-hydroxy-1,1-diphosphonic acid and 18% $HPO_3H_2$.

EXAMPLE III

Water, 1.31 g. (.073 mol) and 4.37 g. (.073 mol) acetic acid were dissolved in 13.7 cc. s-tetrachloroethane and 13.7 cc. di-n-propyl sulfone ($Pr_2SO_2$). Phosphorous oxide, 8.0 g. (.0364 mol $P_4O_6$) was added rapidly to the above mixture at room temperature. Within ½ minute the heat of reaction brought the temperature to 85° C., and a gummy precipitate formed in the previously clear reaction mixture. At this point, the temperature began to fall and heat was applied. The temperature was raised to 128° C. in 15 minutes and allowed to rise slowly from 128° C. to 153° C. over the following 20 minutes. Superheated steam was passed through the reaction mixture for 45 minutes at 130–150° C. The reaction mixture was diluted with water and neutralized to pH 9 with NaOH; a crystalline product was recovered from the aqueous solution by adding isopropyl alcohol. The solid product was recovered by filtration to yield 11.6 g. $P^{31}MR$ analysis of the crystal fraction indicated a composition containing 100% ethane-1-hydroxy-1,1-diphosphonic acid (trisodium salt). The mother liquor was evaporated to dryness to yield a second solid product, yield 10.9 g. $P^{31}MR$ analysis indicated a composition containing 50% ethane-1-hydroxy-1,1-diphosphonic acid (trisodium salt), 30% $Na_2HPO_4$ and 20% $HPO_3Na_2$. $P^{31}MR$ analysis in *total* product indicated a composition containing: 76% ethane-1-hydroxy-1,1-diphosphonic acid (trisodium salt), 14% $Na_2HPO_4$ and 10% $HPO_3Na_2$.

EXAMPLE IV

Water, 1.62 cc. (.090 mol) was added to 10.0 g. (.045 mol) $P_4O_6$ dissolved in 50 cc. $Pr_2SO_2$. The reaction mixture was cooled during the water addition to prevent the temperature from exceeding 50° C. Acetic acid, 6.75 g. (.1125 mol) was added and heat applied to the reaction mixture. The temperature was increased to 132° C. over an 80-minute period. During this time the gummy precipitate became more viscous, until at this point it was a hard solid. During the following 35 minutes at 132° C., the hard solid began to crystallize and break into a loose slurry of white crystals suspended in the $Pr_2SO_2$ solvent. The reaction mixture was digested an additional 60 minutes at 132° C. for a total of 3 hours reaction time. The solid product was removed by filtration and washed free of solvent with $CHCl_3$. A total of 12.5 g. of solid was recovered. $P^{31}MR$ analysis indicated a composition containing 100% cyclic condensate of ethane-1-hydroxy-1,1-diphosphonic acid.

The filtrate and washings were diluted with water and the organic solvents removed by $CHCl_3$ extraction. The water layer was concentrated by evaporation to 5.5 g. of syrup. $P^{31}MR$ analysis indicated a composition containing 29% ethane-1-hydroxy-1,1-diphosphonic acid, 67% cyclic condensate of ethane-1-hydroxy-1,1-diphosphonic acid and 4% $HPO_3H_2$. $P^{31}MR$ analysis of *total* product indicated a composition containing 8% ethane-1-hydroxy-1,1-diphosphonic acid, 91% cyclic condensate of ethane-1-hydroxy-1,1-diphosphonic acid and 1% $HPO_3H_2$.

EXAMPLE V

Phosphorous oxide, 9.15 g. $P_4O_6$ (.0415 mol) was added to 40 cc. $Pr_2SO_2$ containing 1.44 cc. (.088 mol) $H_2O$ with the temperature being held at 40° C. with a cooling bath. A white gum separated as the $P_4O_6$ was added. Acetic acid, 9.35 g. (.1557 mol) was added rapidly at 29° C.; most of the gum redissolved. The nearly clear reaction mixture was heated with a 137° C. oil bath. Within two minutes the reaction temperature reached 105° C. and a gummy precipitate had again formed. The temperature was raised to 133° C.; the gum changed to a hard solid and then broke into a loose slurry as the sample crystallized after 90 minutes at 133° C. The slurry was digested an additional 2 hours at 133° C. The solids were recovered by filtration to yield 14.7 g. $P^{31}MR$ analysis indicated a composition containing 100% cyclic condensate of ethane-1-hydroxy-1,1-diphosphonic acid.

The mother liquor was extracted with water-chloroform and the aqueous layer evaporated to yield 1.2 g. of a viscous syrup. $P^{31}MR$ analysis indicated a composition containing 88% ethane-1-hydroxy-1,1-diphosphonic acid (including a half condensate of ethane-1-hydroxy-1,1-diphosphonic acid) and 12% $HPO_3H_2$. $P^{31}MR$ analysis of *total* product indicated a composition containing 7% ethane-1-hydroxy-1,1-diphosphonic acid, 92% cyclic condensate of ethane-1-hydroxy-1,1-diphosphonic acid and 1% $HPO_3H_2$.

EXAMPLE VI

Phosphorous oxide, 11.3 g. (0.0514 mol) $P_4O_6$ and 11.9 g. (0.198 mol) $CH_3COOH$ were dissolved in 56 cc. $Pr_2SO_2$. The temperature rose spontaneously to 40° C. as a gummy precipitate formed. The reaction mixture was heated with a 130° C. oil bath. After a total of four minutes, the gum became a hard solid. Water, 1.8 cc. (0.1 mol) was added after six minutes and again after 2½ hours. During this time, and for a total of four hours, the reaction temperature was maintained with a 130° C. oil bath. The reaction mixture was cooled, diluted with a total of 230 cc. of water, and the organic solvents removed by $CHCl_3$ extraction. The aqueous layer was neutralized to pH 9 with NaOH and evaporated to yield 34 g. of a solid product. $P^{31}MR$ analysis indicated a composition containing 45% ethane-1-hydroxy-1,1-diphosphonic acid (trisodium salt), 48% cyclic condensate of ethane-1-hydroxy-1,1-diphosphonic acid (pentasodium salt) and 7% $HPO_3Na_2$.

EXAMPLE VII

Water, 1.85 cc. (0.1028 mol) was dissolved in 56 cc. $Pr_2SO_2$. Phosphorous oxide 11.3 g. (0.0513 mol $P_4O_6$) was added over a 1-minute period with the temperature being held at 55 to 60° C. with a cooling bath. The $P_4O_6$ addition caused the separation of a gummy precipitation. The reaction mixture was cooled to 36° C. over an 8-minute period; at this point 6.15 cc. (.1025 mol) $CH_3COOH$ was added. The reaction mixture was heated to 126° C. over a 20-minute period and this temperature maintained for an additional 2 hours. Superheated steam was passed through the reaction mixture for 90 minutes at 140° C. The product was diluted with water and the $Pr_2SO_2$ removed by $CHCl_3$ extraction. The aqueous layer was neutralized to pH 9 with NaOH and evaporated to yield 30 g. of a solid product. $P^{31}MR$ analysis indicated a composition containing 78% ethane-1-hydroxy-1,1-diphosphonic acid (trisodium salt), 12% cyclic condensate of ethane-1-hydroxy-1,1-diphosphonic acid (pentasodium salt), 6% $HPO_3Na_2$ and 4% $Na_2HPO_4$.

EXAMPLE VIII

Acetic acid, 8.4 cc. (0.14 mol) and 2.5 cc. (0.14 mol) water were dissolved in 50 cc. di-n-propyl sulfone ($Pr_2SO_2$) at room temperature. Phosphorous oxide, 15.4 g. (0.07 mol $P_4O_6$) was added quickly; the temperature rose sharply to 99° C., and a gum separated within two minutes. The reaction mixture was heated to a maximum of 150° C. over a 45 minute period. Superheated steam was passed through the reaction mixture for 40 minutes at 140° C., resulting in a reaction mixture having two liquid layers. The layers were separated by decanting. The $Pr_2SO_2$ layer contained $HPO_3H_2$ and EHDP in minor amounts. The water layer was neutralized to pH 9 with NaOH and freeze dried, resulting in 35.3 g. solid containing 18.6% $H_2O$ by analysis. $P^{31}MR$ analysis indicated a composition containing 44% ethane-1-hydroxy-1,1-diphosphonic acid (trisodium salt), 44% cyclic condensate of ethane-1-hydroxy-1,1-diphosphonic acid (pentasodium salt) and 12% $HPO_3Na_2$.

EXAMPLE IX

Acetic acid, 4.6 cc. (0.81 mol) was dissolved in 15 cc. $Pr_2SO_2$ and 20 cc. sulfolane. Phosphorous oxide, 4.2 cc. (.0364 mol $P_4O_6$) was added over a 1-minute period. The temperature rose to 57° C. in 6½ minutes and a gummy precipitate formed. At 8 minutes the temperature was 69° C. and at 13 minutes the temperature was 59° C. The reaction mixture was then heated with an oil bath and held at 110–124° C. for 35 minutes. The reaction mixture was cooled to room temperature and 2.6 cc. (0.146 mol) $H_2O$ in 17.4 cc. sulfolane was added over a 20-minute period. During this time, a reaction temperature of 108° C. was reached and maintained, and the reaction mixture became a clear solution. A temperature of 110° C. was maintained for an additional 30 minutes. The product was neutralized to pH 9.0 with NaOH and extracted 2 times with 100 cc. $CHCl_3$ to remove the organic solvents. The $H_2O$ layer was then evaporated to dryness to yield 23.8 g. of a solid product. $P^{31}MR$ analysis indicated a composition containing 87% ethane-1-hydroxy-1,1-diphosphonic acid (trisodium salt), 9% $HPO_3Na_2$ and 4% $Na_3PO_4$.

EXAMPLE X

Acetic acid, 9.07 g. (0.151 mol) was dissolved in 65 cc. of butyl ether and 11.29 g. (0.0515 mol) $P_4O_6$ was added at room temperature. The clear solution was stirred and heated with a 130° C. oil bath. As the temperature rose to 120° C. over a 7-minute period, a white gum separated which darkened and became too viscous to stir. A temperature of 124–127° C. was maintained for an additional 20 minutes, then cooled to 85° C., water, 13.6 cc., was added cautiously so that the maximum reaction temperature was 110° C. The reaction mixture separated into two liquid layers as the water was added. This mixture was heated to 130–140° C. and superheated steam passed through the mixture to remove the excess acetic acid. The 350 cc. of distillate collected contained 87% of the $CH_3COOH$. The solvents, both water and butyl ether, were removed by evaporation and the residue redissolved in water. Sodium hydroxide was added to pH 10. The water was removed by evaporation to yield a solid product of 32.4 g. containing 14.7% $H_2O$ by analysis, or 27.6 g. anhydrous powder. Analysis by $P^{31}MR$ indicated a composition containing 67% ethane-1-hydroxy-1,1-diphosphonic acid (pentasodium salt), 14% $HPO_3Na_2$ and 1% $Na_2HPO_4$.

EXAMPLE XI

Acetic acid, 4.6 cc. (0.081 mol) was added to 20 cc. sulfolane and 15 cc. $Pr_2SO_2$. The clear solution was heated with a 90° C. oil bath. Phosphorous oxide, 4.2 cc. (0.364 mol $P_4O_6$) was added over a 2-minute period; the pot temperature rose from 75° C. to 120° C. as a gummy precipitate formed. After an additional 2 minutes at 120° C., 2.6 cc. (0.1443 mol) of the gum dissolved. Four minutes later an additional 5 cc. of water was added and the temperature fell to 65° C. An additional 200 cc. of water was added and the mixture extracted with $CHCl_3$ to remove the organic solvents. The water layer was neutralized to pH 9 with NaOH and evaporated to recover 26 g. of a solid product, $P^{31}MR$ analysis indicated a composition containing 75% ethane-1-hydroxy-1,1-diphosphonic acid (trisodium salt), 9% cyclic condensate of ethane-1-hydroxy-1,1-diphosphonic acid (pentasodium salt), 13% $HPO_3Na_2$ and 3% $Na_2HPO_4$.

EXAMPLE XII

Acetic acid, 4.6 g. (.081 mol) was dissolved in 20 cc. sulfolane and 15 cc. $Pr_2SO_2$; 4.2 cc. (.0364 mol) $P_4O_6$ was then added at 32° C. The temperature rose spontaneously; after 3 minutes the temperature was 73° C. and a gummy precipitate had formed in the previously clear reaction mixture. The temperature rose further to 80° C., then fell slowly to 64° C. in the following 7 minutes. At this point 1.3 cc. (.072 mol) $H_2O$ was added which caused the temperature to rise sharply to 92° C. The gummy precipitate changed to a crystalline slurry then back to a gummy mass of solids. The reaction mixture was heated with a 140° C. oil bath and at 116°C. an additional 1.3 cc. (0.72 mol) $H_2O$ was added. The reaction mixture became nearly a clear solution; a slight turbidity due to an immiscible liquid still remained. A temperature of 120° C. was maintained for 4 minutes; the reaction mixture was then cooled to room temperature. The reaction mixture was then diluted with 200 cc. of $H_2O$ and the organic solvents removed by liquid-liquid extraction with $CHCl_3$. The aqueous layer was neutralized to pH 9 with NaOH and evaporated to yield 23.3 g. of a solid product. $P^{31}MR$ analysis indicated a composition containing 39% ethane-1-hydroxy-1,1-diphosphonic acid (trisodium salt), 43% cyclic condensate of ethane-1-hydroxy-1,1-diphosphonic acid (pentasodium salt), 14% $HPO_3Na_2$ and 4% $Na_2HPO_4$.

EXAMPLE XIII

Phosphorous oxide, 4.2 cc. (.0364 mol $P_4O_6$) was dissolved in 42 cc. di-n-propyl sulfone ($Pr_2SO_2$) and 32 cc. sulfolane. Acetic acid 4.17 cc. (0.073 mole), was added to the clear reaction mixture over a 10-minute period at 34° C. to 36° C. The heat of reaction caused a slow increase in temperature; the reaction mixture became turbid 7 minutes after addition of the $CH_3COOH$; 18 minutes after the $CH_3COOH$ addition, the reaction temperature reached 49° C. and a sudden increase in turbidity was noted. The reaction mixture was allowed to cool to 30° C. over a 90-minute period, then heated to 125–130° C. for 20 minutes. At this point 2.62 cc. (0.145 mol) water was added; the temperature rose sharply to 155° C. and the reaction mixture became two liquid layers; an additional 5 cc. of water was added with no further heat of reaction. Superheated steam was passed through the reaction mixture for 75 minutes at a temperature approximately 140° C. The reaction mixture was neutralized to pH 9 with NaOH and the organic solvents removed by liquid extraction with $CHCl_3$. The aqueous layer was evaporated to dryness to yield 23 g. of a solid product. $P^{31}MR$ analysis indicated a composition containing 77% trisodium ethane-1-hydroxy-1,1-diphosphonic acid, 3% cyclic condensate of ethane-1-hydroxy-1,1-diphosphonic acid (pentasodium salt), 18% $HPO_3Na_2$ and 2% $Na_2HPO_4$.

EXAMPLE XIV

Acetic acid ($CH_3COOH$) 2.15 cc. (0.038 mol), was added to 18 cc. dibutyl ether containing 3.94 (0.018 mol) $P_4O_6$ at 10° C. The clear reaction mixture was warmed slowly; at 20 minutes reaction time, temperature 18° C., a second liquid layer formed; at 35 minutes, 50°C., the second liquid layer became a viscous gum. A temperature of 50° C. was maintained for 20 minutes, then the temperature was raised slowly to 137° C. over a 2-hour period and maintained at 137° C. for an additional 1 hour. The viscous gum was dissolved in water for purposes of $P^{31}MR$ analysis. The $P^{31}MR$ analysis indicates a composition containing 66% ethane-1-hydroxy-1,1-diphosphonic acid, 12% cyclic condensate of ethane-1-hydroxy-1, 1-diphosphonic acid, and 22% $HPO_3H_2$.

The $P^{31}MR$ analysis revealed that the product contained 78% of an ethane - 1 - hydroxy - 1,1 - diphosphonic acid species (consisting of 66% ethane-1-hydroxy-1,1-diphosphonic acid and 12% cyclic condensate of ethane-1-hydroxy-1,1-diphosphonic acid) and 22% phosphorous acid.

EXAMPLE XV

Acetic acid, 4.37 g. (0.73 mol), and 1.31 g. (0.073 mol) $H_2O$ were dissolved in 41 cc. di-n-propyl sulfone ($Pr_2SO_2$) and 8.0 g. (.0364 mol) $P_4O_6$ added rapidly. A gum separated as the temperature rose spontaneously to 70° C. in 2½ minutes. The reaction mixture was heated to 130° C. and maintained at that temperature for a total of 60 minutes. Superheated steam was then passed through the reaction mixture for 75 minutes at 140–150° C. The reaction mixture was then cooled to room temperature and neutralized to pH 9.0 with NaOH. The aqueous layer was diluted to 300 cc. with water and the $Pr_2SO_2$ removed by $CHCl_3$ extraction. The water layer was evaporated to dryness to yield 25.4 g. of partially hydrated solids. $P^{31}MR$ analysis indicated a composition containing 60% ethane-1-hydroxy-1,1-diphosphonic acid (trisodium salt), 10% cyclic condensate of ethane-1-hydroxy-1,1-diphosphonic acid (pentasodium salt) and 30% $HPO_3Na_2$.

EXAMPLE XVI

Water, 1.2 cc. (.067 mol) and 4.6 cc. (0.80 mol) acetic acid were dissolved in 13.5 cc. of $Pr_2SO_2$ and 13.5 cc. dibutyl ether. An ice-salt bath was applied to cool the reaction mixture to 16° C. Phosphorous oxide, 7.7 g. (0.035 mol $P_4O_6$) was added rapidly causing a sharp temperature rise to 120° C. and separation of a gummy precipitate from the clear reaction mixture. Heat was then applied and a reaction temperature of 150° C. maintained for 30 minutes. Superheated steam was passed through the reaction mixture for 45 minutes at 140° C. The product was diluted with water and neutralized to pH 9 with NaOH. The remaining organic solvents were removed by liquid-liquid extraction with ethyl ether-water. The aqueous portion was evaporated to dryness for a yield of 25.5 g. of a solid product. $P^{31}MR$ analysis indicated a composition containing 58% ethane-1-hydroxy-1,1-diphosphonic acid (trisodium salt), 7% cyclic condensate of ethane-1-hydroxy-1,1-diphosphonic acid (pentasodium salt), 21% $Na_2HPO_4$, and 14% $HPO_3Na_2$.

In the examples given above the sodium orthophosphate compound $Na_3PO_4$ in the final product is suspected of being an impurity in the $P_4O_6$ starting material (i.e., $P_4O_6$ oxidized to $P_4O_{10}$) rather than a result of the reaction.

EXAMPLE XVII 8.8 gms. of $P_4O_6$ (.04 mol) is added and reacted with 43 cc. of acetic acid (0.76 mol) with continuous stirring. From about .08 to about .16 mol of the acetic acid is utilized for the reaction, while the remainder is used as a diluent in a ratio of about 2–3 volumes of solvent per gram of total reactants. The reaction mixture is heated to the boiling point of about 120° C. The acetic acid vapor is condensed and returned to the reaction vessel for the duration of the reaction. A second liquid layer is formed after about 2 minutes. The reaction mixture is held at reflux temperature for a total of 1 hour. The top liquid layer is removed, and 20 cc. of water are added to the viscous bottom layer. The aqueous solution is again heated to reflux (103° C.) for a period of 2 hours to hydrolyze the product. The aqueous solution is evaporated to yield 18 gms. of a viscous syrup in which the phosphorus exists as ethane-1-hydroxy-1,1-diphosphonic acid by $P^{31}MR$ analysis.

Although the invention has been described with a certain degree of particularity, it is understood that the present disclosure has been made only by way of example and that numerous changes in the details of the procedures may be resorted to without departing from the spirit and scope of the invention as hereinafter claimed.

Having so described the invention, what is sought to be protected by Letters Patent is:

1. A process for preparing ethane-1-hydroxy-1,1-diphosphonic acid which comprises the steps of adding $P_4O_6$ to acetic acid in the presence of an organic solvent, the molar ratio of $P_4O_6$ to acetic acid being in the range of from about 1:1.5 to about 1:50, respectively, thereby forming a reaction mixture containing phosphite intermediate compounds, heating said reaction mixture to a temperature in the range of from about 90° C. to about 150° C. for a minimum period of time of about 3 minutes, thereby converting said phosphite intermediate compounds to phosphonate compounds containing carbon atoms bonded directly to phosphorus atoms and, thereafter, adding water to said heated reaction mixture to hydrolyze said phosphonate compounds containing carbon atoms bonded directly to phosphorus atoms to form a hydrolyzed solution containing free ethane-1-hydroxy-1, 1-diphosphonic acid and free acetic acid, the amount of water being added in excess of the theoretical amount necessary to convert the anhydride of phosphorous acid to free phosphonic acid, the temperature during the hydrolysis being in the range of from about 90° C. to about 170° C.

2. A process according to claim 1 wherein the molar ratio of said acetic acid to said anhydride of phosphorous acid is in the range of 2:1 to 20:1, respectively.

3. A process according to claim 1 wherein said reaction mixture is heated to a temperature in the range of from 100° C. to 140° C.

4. A process according to claim 1 wherein said reaction mixture is heated for a period of time ranging from about 3 minutes to 4 hours.

5. A process according to claim 4 wherein said reaction mixture is heated for a period of time ranging from 15 minutes to 60 minutes.

6. A process according to claim 1 wherein the temperature during said hydrolysis step is in the range of from 100° C. to 150° C.

7. A process according to claim 1 which also includes the additional steps of removing acetic acid from said hydrolyzed solution by passing superheated steam through said hydrolyzed solution at a temperature of from about 100° C. to about 170° C. for a period of from about 15 minutes to about 2 hours, the volume of superheated steam being in the range of from about one volume to about 5 volumes based on the volume of the reaction solution.

8. A process according to claim 7 which also includes the step of separating free ethane-1-hydroxy-1,1-diphosphonic acid reaction product from said organic solvent which comprises mixing the reaction product obtained from the steam distillation step and containing ethane-1-hydroxy-1,1-diphosphonic acid and the organic solvent, with a water-chloroform solution whereby the ethane-1-hydroxy-1,1-diphosphonic acid is dissolved in a water phase and recovered therefrom and whereby the organic solvent is dissolved in said chloroform and recovered therefrom.

9. A process according to claim 1 in which the organic solvent is selected from the group consisting of excess acetic acid, diglyme, normal propyl sulfone, sulfolane, tetrachloroethane, dibutyl ether and mixtures thereof.

References Cited

UNITED STATES PATENTS

| | | |
|---|---|---|
| 3,122,417 | 2/1964 | Blaser et al. _____ 260—502.4 |
| 3,213,129 | 10/1965 | Berth et al. _____ 260—502.4 |

FOREIGN PATENTS 1,148,551  5/1963  Germany.

OTHER REFERENCES

Grunze et al.: "Chem. Ber.," 93 (1960), pp. 2631–8, Q0104.

Menschutkin: "Annalen der Chemie und Pharmacie," Bande 133–4 (1865), pp. 317 to 320, Q01L7.

"The Merck Index," 6th ed. (1952), page 7, R5356M524.

LEON ZITVER, *Primary Examiner.*

J. E. EVANS, *Assistant Examiner.*